United States Patent [19]

Jain et al.

[11] Patent Number: 4,493,086
[45] Date of Patent: Jan. 8, 1985

[54] SYNCHRONOUSLY-PUMPED PHASE-CONJUGATE LASER

[75] Inventors: Ravinder K. Jain, Calabasas; Concetto R. Giuliano, Malibu, both of Calif.

[73] Assignee: Hughes Aircraft Company, El Segundo, Calif.

[21] Appl. No.: 379,837

[22] Filed: May 20, 1982

[51] Int. Cl.³ .................. H01S 3/00; H01S 3/091
[52] U.S. Cl. .................... 372/21; 372/70; 372/99
[58] Field of Search ............. 372/21, 99, 25, 98, 372/70

[56] References Cited

U.S. PATENT DOCUMENTS 4,233,571  11/1980  Wang et al. .................. 372/99

OTHER PUBLICATIONS

Giuliano, "Applications of Optical Phase Conjugation", *Physics Today*, Apr. 1981.
Jain et al., "High-Efficiency Degenerate Four-Wave Mixing of 1.06 μm Radiation in Silicon", *Optics Letters*, vol. 4, No. 10, Oct. 1979, pp. 328-330.
Jain et al., "Generation of Synchronized CW Trains of Picosecond Pulses at Two Independently Tunable Wavelengths", *Appl. Phys. Lett.* 32 (1), Jan. 1978, pp. 41-44.
Lind et al., "Demonstration of the Longitudinal Modes . . . Phase-Conjugate Mirror", *Optics Letters*, vol. 6, Nov. 1981, pp. 554-556.

*Primary Examiner*—James W. Davie
*Attorney, Agent, or Firm*—Gregory D. Ogrod; David W. Collins; Anthony W. Karambelas

[57] ABSTRACT

Laser apparatus is disclosed which employs the principles of phase conjugation to provide for short-pulse operation. A phase-conjugate reflector, lasing medium, and output coupling device are arranged to form a laser resonator. The lasing medium may be pumped by a conventional pump source to produce population inversion in the lasing medium. The phase-conjugate reflector is pulsed by means of a pulsed pump source which applies a periodic train of short laser pulses having high peak power and low average power thereto. The short-duration pulses create high reflective efficiencies in the phase-conjugate reflector, while minimizing the overall energy demands on the system. Additionally, the pump source which pumps the lasing medium may also provide pulsed energy thereto which is synchronous with the pulsed energy provided by the pulsed pump source to the phase-conjugate reflector. Accordingly, the system provides for a series of short pulsewidth laser pulses at its output.

20 Claims, 3 Drawing Figures

SYNCHRONOUSLY-PUMPED PHASE-CONJUGATE LASER

BACKGROUND OF THE INVENTION

The present invention relates generally to lasers employing phase conjugate reflecting elements, and in particular, to phase conjugate lasers wherein the phase conjugate reflector is pumped by means of pulsed laser energy.

During the past decade, there has been a great deal of research activity directed towards the development of laser systems employing phase conjugate reflectors. The concept of phase conjugation involves the use of optionally nonlinear media, which may be activated by means of incident laser energy to restore severely distorted optical beams to their original unaberrated state. A general discussion of the principles of optical phase conjugation may be found in a publication by Concetto R. Giuliano, entitled "Applications of Optical Phase Conjugation", *Physics Today*, April 1981.

The principles of phase conjugation have also been employed to form a laser resonator. Such a device is disclosed in U.S. Pat. No. 4,233,571 entitled "Laser Having a Nonlinear Phase Conjugating Reflector". The laser disclosed herein is one in which one of the conventional end mirrors of the laser resonator has been replaced by a phase conjugate reflector. A variety of phase conjugate reflectors may be employed, which utilize four-wave mixing, three-wave mixing, simulated Raman scattering, stimulated Brillouin scattering, or photon echo processes. These phase conjugation principles are generally well known in the art and some are described in the Giuliano publication cited above.

Current research has been directed towards the use of phase conjugate reflectors in optical resonators to produce a new class of lasers whose output is characterized by beams of high spatial quality. However, for these lasers to properly exhibit their intrinsic advantages, it is imperative that the phase conjugate reflectors, as well as intracavity amplifiers, maintain moderately high values of reflection and amplification, respectively, over time durations that are at least an order of magnitude larger than the resonator cavity round-trip time. This constraint often imposes severe optical energy requirements on the lasers used to pump the phase conjugate reflectors and amplifiers. The high peak powers needed over long time durations often result in thermal problems, making CW operation with high speed phase-conjugate reflectors very difficult.

Thus, it would be an improvement in the laser art to provide a laser system in which the pumping requirements of both phase conjugate reflectors and intracavity amplifiers is minimized. It would also be an advantage to have a laser system which allows for both improved phase conjugation efficiencies and amplifier gain, while requiring only modest average power requirements. It would also be an improvement to provide a laser system in which the thermal problems and overall energy demands placed on the pump lasers are reduced. It would be a further improvement to provide a phase conjugate laser system which is designed for short pulse output.

SUMMARY OF THE INVENTION

In order to provide the aforementioned improvements, the present invention incorporates a lasing medium, phase-conjugate reflector and an output coupling device appropriately disposed along an optical path to form a laser resonator. A laser resonator having a conventional end mirror and a phase-conjugate reflector as the other end mirror may be considered a phase-conjugate laser, for the purposes of the present invention. The output coupling device forms one end mirror of the laser while the phase-conjugate reflector forms the other end mirror. The output coupler is such that it reflects a substantial portion of the energy incident thereupon and transmits a portion of the laser energy to form an output beam of the laser. The phase-conjugate reflector is utilized as the second end mirror of the laser resonator and it reflects the phase conjugate of energy incident thereupon. This portion of the present invention is substantially the same as the device disclosed in U.S. Pat. No. 4,233,571, cited above.

The improvements provided by the present invention include the use of a pulsed pump source which applies laser pulses to the phase-conjugate reflector. The laser pulses have relatively high peak power and relatively low average power. The pulses have a predetermined periodicity which matches the round-trip time for laser energy traversing the laser resonator. The pump pulses are applied to the phase-conjugate reflector in synchronism with the energy traversing the resonator.

In addition, the lasing medium may also be pumped by either a continuous pump source as in conventional laser systems or a pulsed pump source similar to the source used to pump the phase-conjugate reflector. In the pulsed mode, the lasing medium may be pumped by a separate pump source, or a master oscillator arrangement may be employed to pump both media. The pulses provided by this pump source are applied to the lasing medium at an appropriate time so as to be synchronously applied to the energy traversing the laser. Thus, the application of the pulses to the lasing medium is timed in a manner so that the pump energy is applied in synchronism with the pump energy provided by the phase-conjugate reflector.

The present invention contemplates the use of four-wave mixing, three-wave mixing or photon echos as the processes which may be employed as the phase-conjugate reflector. These processes employ a pump laser to stimulate the reflective process in a nonlinear medium. Depending upon the choice of laser wavelength, nonlinear medium and lasing medium, reflectivities in the phase conjugate reflector may approach or exceed unity. Under conditions of high reflectivity and appropriate use of gain media, the present invention allows for the elimination of the pulsed pump source for the phase-conjugate reflector. For example, the power coupled out of the resonator by the output coupler may be fed back to provide the pump energy for a four-wave mixer phase conjugate reflector in order to provide for self-pumping of the phase conjugate laser. In such a system, the pulsed pump source may be employed as a startup mechanism for the laser resonator. In this case, the pulsed pump source could be turned off once the resonator was fully operational. However, the pump source of the lasing medium would remain operational in any event.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
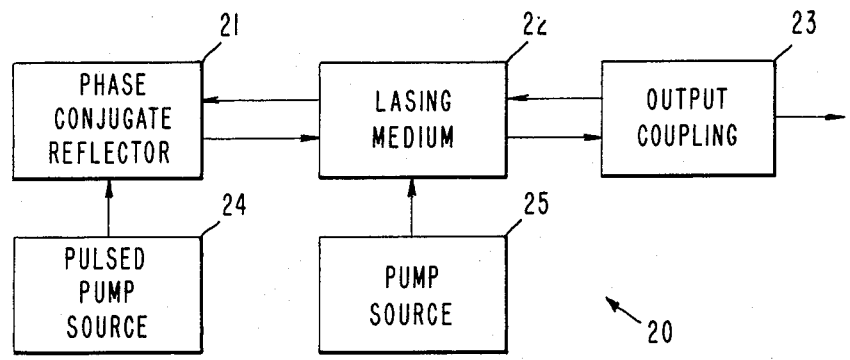
FIG. 1 illustrates a first embodiment of a synchronously-pumped phase-conjugate laser in accordance with the principles of the present invention.

Referring to FIG. 1, a synchronously-pumped phase-conjugate laser 20 in accordance with the principles of the present invention is shown. The laser 20 comprises a phase-conjugate reflector 21, lasing medium 22, and output coupling device 23 disposed along an optical path. A laser resonator is formed between the phase-conjugate reflector 21 and the output coupling device 23. The phase-conjugate reflector 21 may be any of a number of phase-conjugate reflecting devices which employ four-wave mixing, three-wave mixing, or photon echo processes, or the like. These processes are well-known in the art and are described in a variety of patents and publications including "Applications of Optical Phase Conjugation" and U.S. Pat. No. 4,233,571, cited above.

The output coupling device 23 may be a partially reflecting and partially transmitting mirror as is present in a conventional laser resonator, or any other conventional device known in the art. The lasing medium 22 may be any conventional lasing medium such as a dye, neodymium YAG (Nd:YAG), $CO_2$, or ruby, or the like. It is to be understood that the phase-conjugate reflector 21, lasing medium 22 and output coupling device 23 are all selected to have appropriate operating frequency regimes which are compatible. The Giuliano publication includes a table which illustrates a variety of lasing media, phase conjugation processes, nonlinear media, and measured reflectivities of the phase-conjugate reflectors for a variety of laser wavelengths.

A pulsed pump source 24 and a pump source 25 are provided to pump both the phase-conjugate reflector 21 and lasing medium 22, respectively. Although shown as a conventional pump source, pump source 25 may, in addition, be pulsed in a manner similar to the pulsed pump source 24. The alternative nature of pump source 25 will be discussed in more detail below. The pulsed pump source 24 may be a conventional mode-locked laser which is compatible with the nonlinear medium employed in the phase-conjugate reflector 21. For example, the pulsed pump source 24 may be a Q-switched and mode-locked neodymium YAG laser used to generate four-wave mixing in the phase conjugate reflector 21. In this process, the nonlinear medium employed in the phase-conjugate reflector 21 may be silicon, or a saturable absorber, or the like. This four-wave mixing scheme is described in a publication entitled "High Efficiency Degenerate Four-Wave Mixing of 1.06 Micron Radiation in Silicon", by R. K. Jain et al, published in *Optics Letters,* Vol. 4, No. 10, October 1979. In addition, numerous other materials and lasers may be employed as is indicated in the table mentioned above.

In order to achieve correct operation, the pulsed pump source 24 must be pulsed with a periodicity which matches the cavity round-trip time of the energy resonating in the laser 20. Also, the timing of the excitation pulses from the pulsed pump source 24, including the initiation time and duration, must be appropriately controlled to ensure that the pump energy is transferred to the resonating energy. This is automatically the case when only one pulsed pump source (for example, pump source 24) is used, since this source drives the system, and hence controls the timing of the resonator. However, if the pump source 25 is also a pulsed source, it must have the appropriate timing requirements in relation to the pulsed pump source 24 in order to properly pump the energy as it traverses through the lasing medium 22. The nature of the pulsed energy provided by the pulsed pump source 24 is such that it has a relatively high peak power and a relatively low average power. The energy requirement and pulse duration of the pulses provided by the pulsed pump source 24 vary depending upon the selection of components used in the laser 20.

If the pump source 25 is also operated in a pulsed mode, both pump sources 24, 25 may be provided by means of a master oscillator arrangement. When both pump sources 24, 25 are pulsed, the resonator may be configured such that the optical energy requirement necessary for pumping are held to a minimum. The master oscillator may include the use of an optical frequency shifting device if two separate wavelengths are desirable for use in the phase conjugate reflector 21 and lasing medium 22. If the two pump sources 24, 25 are operated in a pulsed mode and are not of common origin (master oscillator), a timing circuit arrangement or an optical delay line may be employed to control the synchronization and relative timing of the two pump sources 24, 25 as is required for optimal operation.

Figure 2:
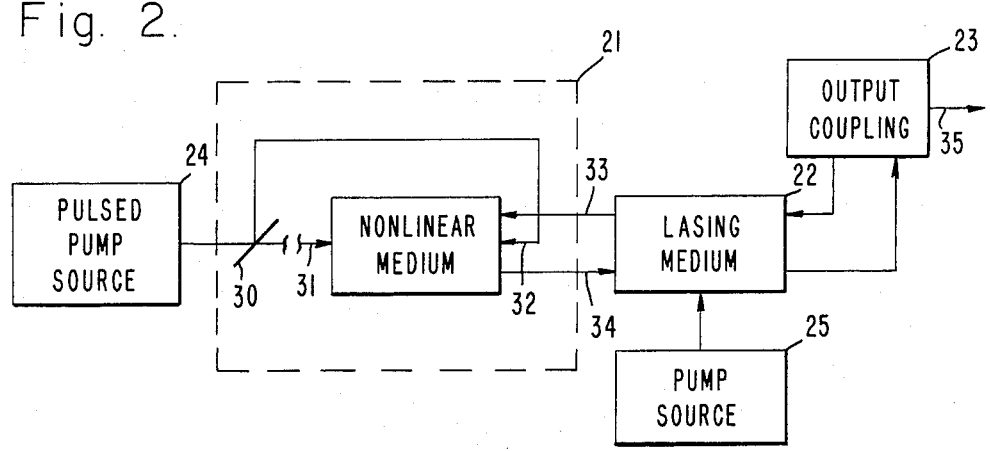
FIG. 2 shows a more detailed illustration of the laser of FIG. 1, particularly employing four-wave mixing as the phase conjugation process.

The operation of the present invention will be explained with reference to FIG. 2. FIG. 2 shows a specific embodiment of the present invention which employs four-wave mixing as the phase conjugation process in the phase-conjugate reflector 21. One specific system may employ a dye as the lasing medium 22, which may be pumped in a continuous manner by an argon ion or doubled YAG laser, or pumped in a synchronously-pumped manner by a mode-locked laser used as the pump source 25. The nonlinear medium 26 in the phase-conjugate reflector 21 may be sodium gas which is pumped by the pulsed pump source 24, which may be a synchronously-pumped dye laser. A discussion of synchronous pumping may be found in a publication entitled "Generation of synchronized CW trains of picosecond pulses at two independently tunable wavelengths", by R. K. Jain et al, Appl. Phys. Lett., Vol. 32, No. 1, January 1978.

A CW dye laser has been experimentally demonstrated incorporating a phase-conjugate mirror. Reference is made to a publication by R. C. Lind et al, entitled "Demonstration of the Longitudinal Modes and Aberration-Correction Properties of a Continuous-Wave Dye Laser with a Phase-Conjugate Mirror", published in Optics Letters, Vol. 6, November 1981. This laser system, however, did not employ pulsed pump sources as is provided by the present invention.

The output coupling device 23 may be a mirror arrangement which reflects a portion, say 80% of the energy and transmits the remainder as an output beam 35 of the laser 20. The pulsed pump source 24 applies a series of short laser pulses having high amplitude and relatively low average power to the nonlinear medium 26. Each laser pulse is split by means of a beamsplitter 30, or the like, and applied to opposite ends of the nonlinear medium 26 at pulses 31, 32. It is to be understood that the optical path length that each of the pulses 31, 32 traverse prior to impinging upon the nonlinear medium 26 should closely matched in order to ensure that the pulses applied to the two ends of the nonlinear medium 26 are timed to arrive at the medium 26 within a duration shorter than the coherence time thereof.

Phase conjugation occurs in the nonlinear medium 26 at times when both pump pulses 31, 32 are incident upon the nonlinear medium 26 within a time duration less than the coherence time thereof. The coherence time of the nonlinear medium 26 corresponds to a relaxation time in which the medium 26 feels the effects of an incident pulse. In addition, a third pulse 33, or probe pulse 33, which represents the intracavity power in the laser 20, and which undergoes phase conjugation, must also be timed appropriately. The presence of all three pulses 31, 32, 33 in the nonlinear medium will generate a backscattered pulse 34 which is the phase conjugate of the probe pulse 33. The nonlinear medium 26 is active in producing phase conjugated energy when the three laser pulses 31, 32, 33 are present in the nonlinear medium 26 with relative time delays that are less than appropriate relaxation times in the nonlinear medium 26. The phase-conjugate reflector 21 is hence turned on and off based upon the duration and period of the applied laser pulses 31, 32, 33 and the relaxation times of the nonlinear medium 26. Thus, the overall gain of the laser system is modulated so as to have a relatively low duty cycle. This keeps the overall energy requirements of the system low, while the high phase-conjugation efficiencies, and high peak powers of the pump laser pulses allow for high peak powers to be provided as the output pulse 35 of the laser 20.

In order for the laser 20 to work properly, the response time of the phase-conjugate reflector 21 and the duration of the laser pulses 31, 32, 33 in the nonlinear medium 26 should be much smaller than the cavity round-trip time. The cavity round-trip time is matched to the period of the pulse train provided by the pulsed pump source 24. In addition, if pump source 25 is operated in a pulsed mode, its pulses must be applied to the lasing medium 22 at the proper time when the laser pulse 33 is traversing through the lasing medium 22. Hence, the pulses which circulate in the laser resonator, represented by pulse 33 and reflected pulse 34 arrive at the lasing medium 22 and nonlinear medium 26 at the exact times when the respective media 26, 22 are turned on by means of their respective pump sources 25, 24. For the remainder of the period, the phase-conjugate reflector 21 and lasing medium 22 are turned off.

Figure 3:
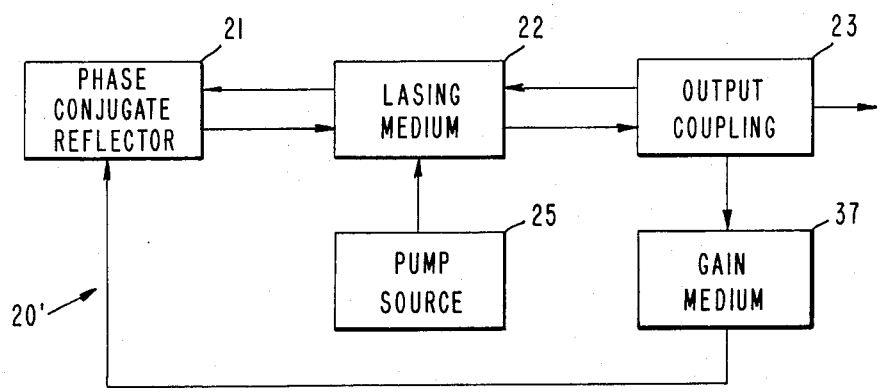
FIG. 3 illustrates a self-pumped embodiment of a laser in accordance with the principles of the present invention.

In certain circumstances, the reflectivity provided by the phase-conjugate reflector 21 may be quite high and may also exceed unity. Such is the situation when using a pulsed dye laser as pulsed pump source 24 and sodium as the nonlinear medium 26. Other examples may be found in the table of the Giuliano publication cited above. With reference to FIG. 3, when the reflectivity of the phase conjugate reflector 21 is large and the gain of the lasing medium 22 can be made high enough, the requirement for the pulsed pump source 24 may be eliminated once the system is in operation. This is true because so much energy is available in the output pulse 35, and a portion of this pulse, with amplification outside the resonator cavity (if required), may be used in a feedback arrangement to provide the pulses which stimulate the four-wave mixing process. The feedback loop may be provided by a beamsplitter, or the like, in order to couple a portion of the output pulse back to the phase-conjugate reflector 21. In order for this to occur, the output coupling device 23 must transmit a larger portion of the energy, which in turn is partially coupled back to the phase conjugate reflector 21. An external gain medium 37 may be employed in the feedback loop to ensure that the pump beams have the required energy. In this configuration, the pump source 25 may still be required to generate the inverted population in the lasing medium 22.

Thus, there has been described a new and improved synchronously pumped phase conjugate laser system which provides for short pulse operation with low average power. The short pulse excitation and high peak powers associated with the pulses allow the attainment of high phase conjugation efficiencies and high amplifier gains, while the repetitive nature of the excitation allows for build-up of lasing action in such a laser with the use of modest average power. The reduced power requirements lowers the overall energy demands placed on the pump sources while also minimizing thermal problems.

It is to be understood that the above-described embodiments are merely illustrative of some of the many specific embodiments which represent applications of the principles of the present invention. Clearly, numerous and varied other arrangements may be readily devised by those skilled in the art without departing from the spirit and scope of the invention.

What is claimed is:

1. Laser apparatus comprising a lasing medium disposed along an optical path, phase-conjugate reflecting means disposed at one end of said optical path adjacent to said lasing medium for reflecting laser energy which is the phase conjugate of laser energy incident thereupon, and output coupling means disposed at the other end of said optical path adjacent to said lasing medium in order to form a laser resonator between said phase-conjugate reflecting means and said output coupling means for reflecting a substantial portion of the laser energy incident thereupon to sustain laser operation and for transmitting a portion of the laser energy as an output beam, wherein the improvement comprises:

pumping means for applying laser pulses to said phase-conjugate reflecting means and to said lasing medium, said laser pulses having a relatively high peak power and relatively low average power, said laser pulses having a predetermined periodicity which matches the round-trip time for laser energy traversing said resonator, said laser pulses being applied to said phase-conjugate reflecting means and said lasing medium when the laser energy traversing said resonator is present therein.

2. The laser apparatus of claim 1 wherein the arrangement further comprises:

second pumping means for applying laser pulses to said lasing medium in synchronism with the laser pulses provided by said pumping means to said phase conjugate reflecting means.

3. The laser apparatus of claim 1 wherein said pumping means further comprises:

a master oscillator for providing pulsed pumping radiation to said lasing medium and said phase-conjugate reflector;

first radiation coupling means for coupling pulsed pumping radiation to said lasing medium from said master oscillator; and second radiation coupling means for coupling pulsed pumping radiation to said phase-conjugate reflector from said master oscillator.

4. The laser apparatus of claim 3 wherein said master oscillator comprises a pulsed laser.

5. The laser apparatus of claim 3 further comprising:
at least one frequency shifting means operatively connected between said master oscillator and said phase-conjugate reflecting means.

6. The laser apparatus of claim 3 further comprising:
at least one frequency shifting means operatively connected between said master oscillator and said lasing medium.

7. The laser apparatus of claim 1 wherein said pumping means further comprises:
a master oscillator for providing substantially steady state pumping radiation for said lasing medium and said phase-conjugate reflector;
first radiation coupling means for coupling substantially steady state pumping radiation to said lasing medium from said master oscillator;
pulse forming means operatively connected to said master oscillator for providing pulsed radiation to said phase-conjugate reflecting means from said master oscillator steady state output, at a predetermined rate determined by the round-trip time for laser energy in said resonator; and
second radiation coupling means disposed between said pulse forming means and said phase-conjugate reflecting means for providing pulsed pumping radiation to said phase-conjugate reflector means from said pulse forming means.

8. The laser apparatus of claim 7 further comprising:
at least one frequency shifting means operatively connected between said master oscillator and said phase-conjugate reflecting means.

9. The laser apparatus of claim 7 further comprising:
at least one frequency shifting means operatively connected between said master oscillator and said lasing medium.

10. The laser apparatus of claim 2 further comprising:
synchronization means connected between said pumping means and said second pumping means for affecting the pulse rates of each pumping means such that radiation is applied to said phase-conjugate reflecting means in proper relation to the round-trip time for laser energy in said resonator.

11. The laser apparatus of claim 2 further comprising:
feedback means for coupling a portion of said output beam to said phase-conjugate reflecting means for providing a predetermined level of pumping radiation.

12. The laser apparatus of claim 11 wherein said feedback means further comprises:
a beam splitter disposed along said optical path adjacent to said output coupling means; and
energy transfer means disposed between said beam splitter and said phase-conjugate reflecting means for transferring a predetermined portion of said output beam to said phase-conjugate reflecting means.

13. The laser apparatus of claim 11 further comprising:
gain means disposed between said feedback means and said phase-conjugate reflecting means for providing gain to the coupled pumping radiation.

14. The laser apparatus of claim 1 further comprising:
second pumping means for providing steady state pumping radiation to said lasing medium while said pumping means provides pulsed pumping radiation to said phase-conjugate reflector means.

15. The laser apparatus of claim 14 further comprising:
synchronization means connected between said pumping means and said second pumping means for affecting the pulse rates of each of said pumping means in proper relation to the round-trip time for laser energy in said resonator.

16. The laser apparatus of claim 14 further comprising:
feedback means for coupling a portion of said output beam to said phase-conjugate reflecting means for providing a predetermined level of pumping radiation.

17. The laser apparatus of claim 16 wherein said feedback means comprises:
a beam splitter disposed along said optical path adjacent to said output coupling means; and
transfer means disposed between said beam splitter and said phase-conjugate reflecting means for transferring a predetermined portion of said output beam to said phase-conjugate reflecting means.

18. The laser apparatus of claim 16 further comprising:
gain means disposed in said feedback for providing gain to said pumping radiation.

19. The laser apparatus of claim 1 further comprising:
feedback means for coupling a portion of said output beam to said phase-conjugate reflecting means for providing a predetermined level of pumping radiation.

20. The laser apparatus of claim 11 further comprising:
gain means disposed between said feedback means and said phase-conjugate reflecting means for providing gain to the coupled pumping radiation.

* * * * *